INVENTOR.
Waldemar T. Rentschler
BY
Arthur A. March
ATTORNEY

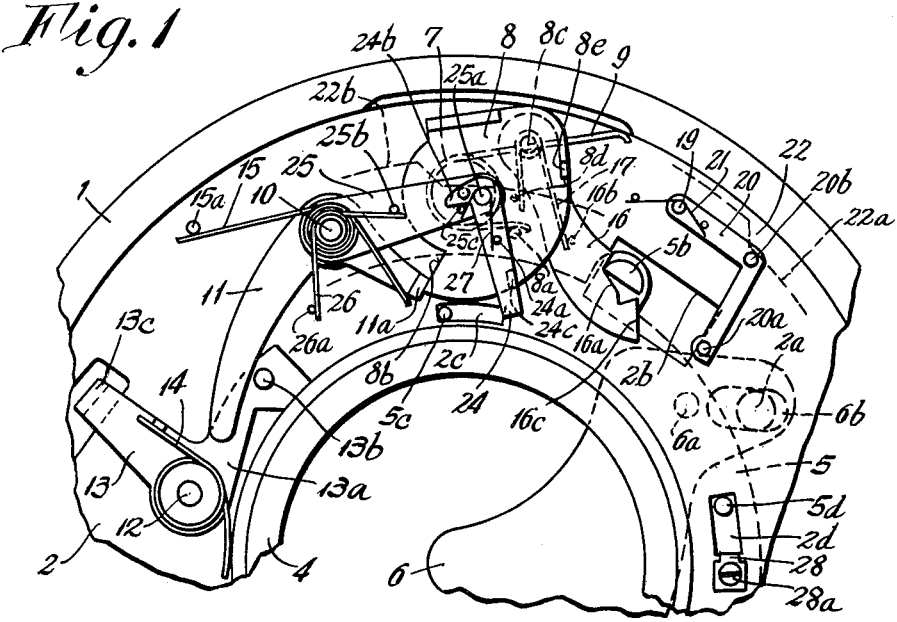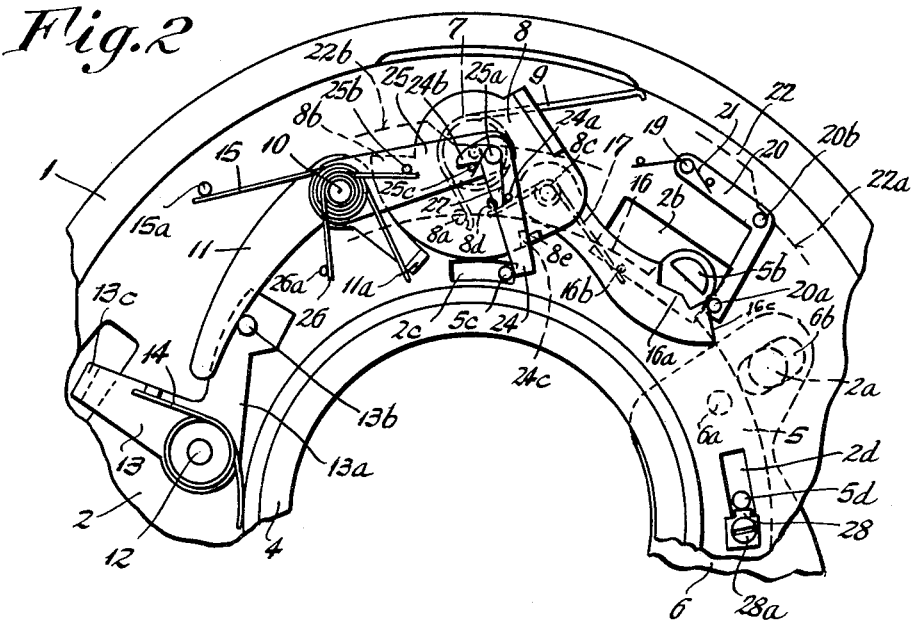

INVENTOR.
Waldemar T. Rentschler
BY
Arthur A. March
ATTORNEY

United States Patent Office 3,153,999
Patented Oct. 27, 1964

3,153,999
PHOTOGRAPHIC INTRA-LENS SHUTTER WITH
RECIPROCATING SHUTTER BLADES
Waldemar T. Rentschler, Calmbach (Enz), Germany, assignor to Alfred Gauthier, G.m.b.H., Calmbach (Enz), Germany, a corporation of Germany
Filed Nov. 19, 1962, Ser. No. 238,541
Claims priority, application Germany Nov. 22, 1961
11 Claims. (Cl. 95—63)

This invention relates to a photographic intra-lens shutter with reciprocating shutter blades and, particularly, to means for achieving high speed operation.

Heretofore it has not been possible to obtain higher speeds of operation of an intra-lens shutter with reciprocating blades without substantially increasing the cost nor without increasing the force accumulated in the shutter spring during the cocking thereof.

In accordance with the present invention means are provided for operating the described intra-lens shutter with no increase in cost and without any necessity for increasing the force stored in the shutter spring during the cocking thereof.

In accomplishing the aforesaid results the present invention provides a deflecting member which can be moved by means of an exposure time setting member so that it is either in or out of the path of motion of a pawl that operates the shutter blades. When the deflecting member is out of the path of motion of the pawl, operation of the shutter takes place in the customary fashion with the pawl driving an actuating ring for the shutter blades first in one direction and later in the reverse direction to cause the blades to move reciprocatingly from a closed position to an open position and back to a closed position. In accordance with this invention, however, when the deflecting member is placed in such a position as to intercept the pawl and to deflect it out of the way, the actuating ring for the shutter blades is immediately free to return to its closed position and, furthermore, is driven back to its closed position by means of a transmission member. The latter is brought into operative position at the same time as the deflecting member and thereupon engages the main shutter driving member to extract potential energy stored in the main driving spring. This energy is used to return the shutter actuating member and consequently the shutter blades to their original positions faster than when the operation is conducted by the pawl alone. Accordingly, it is possible to operate such a shutter at higher speeds without increasing the strength of the shutter driving spring.

According to the present invention the mechanism for accomplishing the desired result includes an adjusting lever on which a transmission member is pivotally mounted. The position of the transmission member is determined by the setting of the adjusting lever which, in turn, engages a cam that is operated by or is a part of the exposure time setting member.

A setting of the exposure time with a small expenditure of force, even when the shutter has completed an exposure, is accomplished by the present invention because the adjusting lever is connected positively to a cam of the exposure time setting member. This structure also provides for flexibility and freedom of choice. As a result, the exposure time setting member may be changed to a new setting position without influencing the transmission member even when, at the end of an exposure, the transmission member is clamped by the action of the main driving spring between the driving pins of the shutter driving member and the actuating member.

Further, in accordance with the present invention, a stop may be provided on the transmission member which can be moved selectively in response to the motion of the adjusting lever so as to bring the stop either in or out of the path of motion of a driver located on the shutter driving member. With this construction it is possible to minimize the adjusting path over which it is necessary to move the transmission member in or out of operative position. Another advantage resulting from the small path of motion of the transmission member is that the remaining structural members of the shutter need not be subjected to any limitation with respect to their arrangement or to their freedom of motion.

Additionally a fixed stop serving as a reflector may be associated with the actuating member of the shutter blades. This fixed stop is adapted to operate when the shutter blades are opened to the maximum position whereby the driving members of the shutter are effectively relieved so that the actuating member is returned by the reflector.

Other advantages and objects of the present invention are set forth in the accompanying specification which, it will be understood, illustrates only an embodiment of the invention itself taken in conjunction with the accompanying drawings in which:

FIG. 1 is a fragmentary diagrammatic front elevational view showing a portion of a photographic intra-lens shutter construction with the front plate removed with the shutter in cocked position, and set at the shortest exposure time. All those members of the shutter construction of the camera which are not essential for an understanding of the invention being omitted for the sake of clarity of illustration;

FIG. 2 is a view similar to that of FIG. 1 but showing the intra-lens shutter after release during its running down motion and specifically at the moment when the actuating member of the shuter blades has reached its point of reversal;

Figure 3:
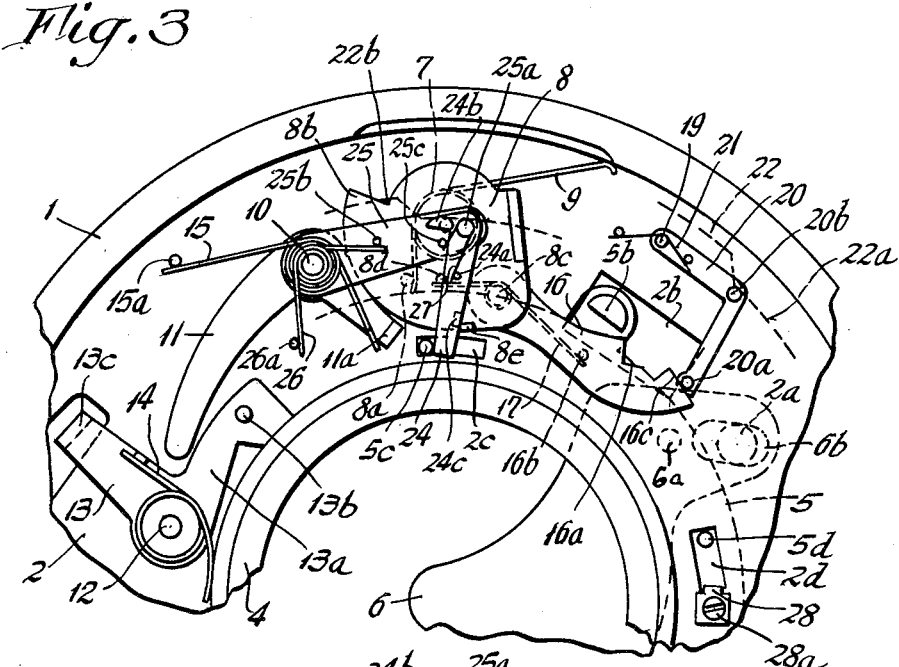
FIG. 3 is a view similar to that of FIG. 1 but showing the shutter in run-down position, in which position the shutter driving member has returned to starting position and the shutter blades are in closed position.

In the drawings, reference character 1 refers to a shutter housing having a base plate 2 affixed thereto. The base plate has a central aperture surrounded by tubular member 4 on which a drive ring, or actuating ring 5, is rotatably mounted. The actuating ring 5 is connected to shutter blades 6 (only one of which is shown for clarification purposes) by means of pins 6a. The shutter blades 6 are guidably movable by means of pins 2a which extend from the base plate 2 and interlock with slots 6b in the shutter blades.

A shaft 7 is rotatably positioned in the shutter housing 1 and a driving member 8 of a well known disc type is attached to one end of the shaft. The other end of the shaft 7 extends from the shutter housing 1 and is connected to an actuating device, such as the film transport mechanism of the camera. The driving member 8 is resiliently biased by means of a spring 9 that surrounds the shaft 7 and engages the inner wall of the housing 1 as well as a pin 8a on the driving member 8. The spring 9 consequently exerts pressure in the clockwise direction on the driving member 8.

Figure 4:
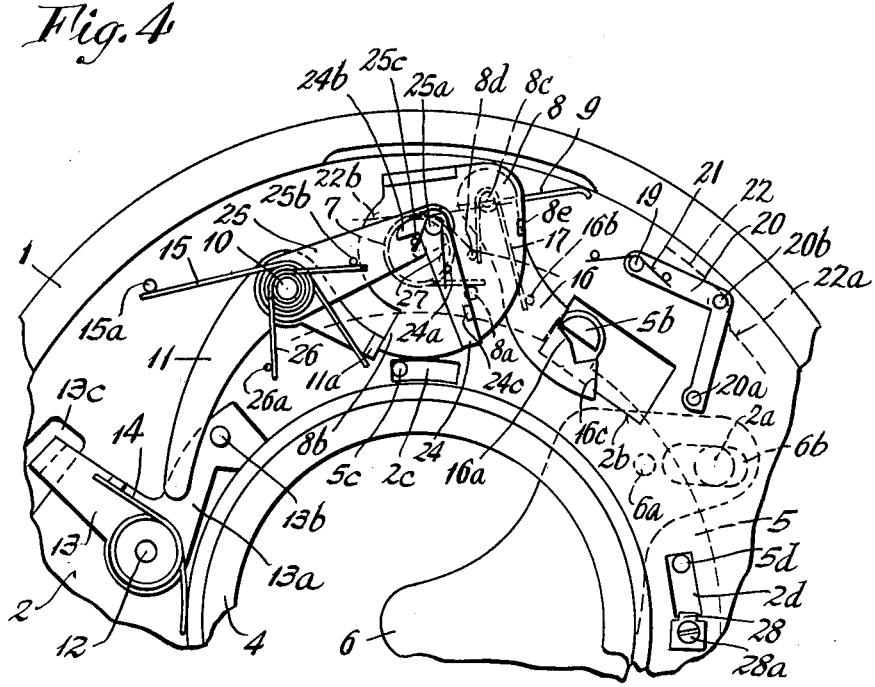
FIG. 4 is a view similar to that of FIG. 1 showing the shutter in cocked position. The shutter is set at an exposure time of longer duration and the deflecting member and the transmission member associated therewith are in inoperative position.

In order to keep the driving member 8 in cocked position (as illustrated in FIGS. 1 and 4) an arresting lever 11 pivotally mounted on an axle 10 is provided with a bent-off lug 11a which projects into the path of motion of a locking surface 8b on the driving member 8. The other end of the arresting lever 11 is actuated by means of a release lever 13 which is mounted on an axle 12. The release lever 13 is provided with an arm 13a and a driving pin 13b for engagement with the arresting lever 11. The lever 13 is also provided with a lug 13c which is actuated by the camera release member or shutter trigger (not shown). The lever 13 is spring-biased by means of a coil spring 14 which influences the lever for movement in a clockwise direction. In addition to the release lever 13, the arresting lever 11 is also controlled in part by means of a coil spring 15, one end of which engages a pin 15a and the other end of which presses against the lug 11a and influences the lever 11 for movement in a counterclockwise direction.

A driving pawl 16 is pivotally mounted on a pin 8c that extends from the shutter driving member 8. The free end of the pawl 16 is provided with coupling jaws 16a which embrace a pin 5b that extends from the actuating ring 5 which controls the shutter blades 6. The actuating ring 5 is located on the side of the base plate 2 which is opposite from the pawl 16. The pin 5b extends through an opening 2b in the base plate. The pawl 16 is influenced for movement in a counterclockwise direction about its pivot pin 8c by means of a spring 17, one end of which bears against a pin 8d on the driving member 8 and the other end of which bears against a pin 16b on the pawl 16.

Figure 6:
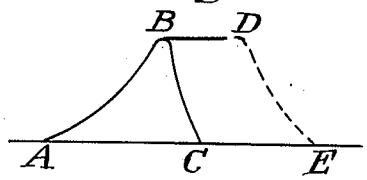
FIG. 6 is an aperture-area time diagram of the motion of the shutter blades.
Figure 7:
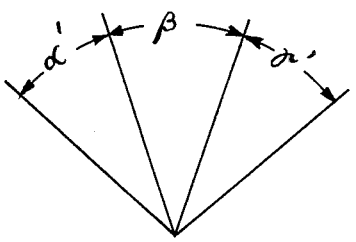
FIG. 7 is a diagram graphically depicting the entire open time of a shutter using the conventional driving-pawl drive heretofore known.
Figure 8:
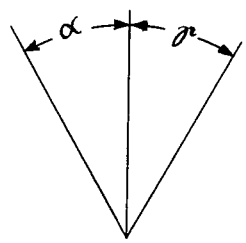
FIG. 8 is a diagram graphically depicting the entire open time of the shutter when the means provided by the present invention is utilized.

The operation of the shutter is graphically illustrated in FIGS. 6 through 8. In FIG. 8, the angle $\alpha$ indicates the time required for the shutter blades 6 to move to the fully opened position and the angle $\alpha$ illustrates the length of time required for the shutter blades to return to the fully closed position. The shortest duration of exposure is obtained when the shutter blades close immediately after opening without remaining at the fully opened position for any appreciable length of time. For slower operating shutter speeds, FIG. 7 illustrates in addition to angles $\alpha'$ and $\alpha'$, and a dwell angle $\beta$ during which the shutter is fully opened. FIG. 6 shows the extent to which the shutter blades are opened as a function of time, and illustrates that for any shutter speed the same time duration is required to move the shutter blades to the fully opened position B from the fully closed position A. For a very short exposure, the shutter blades 6 return immediately to the closed position at a time indicated by C while for an exposure of longer duration the blades remain in the fully opened position until a later time D as determined by the camera controls and then return to the closed position at time E.

In order to obtain an extremely short exposure time as indicated in FIG. 8, a deflecting member 20 is provided. This member is pivotally mounted on a pin 19 which extends from the base plate 2. The deflecting member is in the form of a bar bent to approximately a right angle and provided with a pin 20a at the opposite end from the pin 19. In addition, the deflecting member also carries a control pin 20b and is biased counterclockwise by means of a spring 21. Consequently, the pin 20b presses against a control edge 22a of an exposure time setting member 22 which is used to set the duration of exposure of the camera. The control edge, or cam, 22a is shown in dotted lines and is located in such position that when the exposure time setting member 22 is adjusted for the fastest speed of operation of the shutter, the pin 20a is in the path of motion of the driving pawl 16. However, when the exposure time setting member 22 is moved to a position for longer exposure times, a different portion of the cam 22a engages the pin 20b and permits the lever 20 to rotate slightly counterclockwise so as to remove the pin 20a from the path of motion of the pawl 16. The pawl 16 has an oblique deflecting edge 16c which engages the pin 20a when the latter is set for high speed operation of the shutter. As a result, the driving pawl 16 is deflected from its normal path of motion at the moment it reaches the fully opened position of the shutter blades 6. The pin 5b becomes disengaged from the pawl 16 and is free to return immediately to its initial position causing the return of the shutter blades 6 to their closed position.

According to the invention, a transmission member 24 is associated with the deflecting member 20. The transmission member 24 is pivotally mounted on a pin 25a of an adjusting lever 25 which, for structural simplicity is in turn pivotally mounted on the same axle 10 as the arresting lever 11. The adjusting lever 25 is resiliently biased by a spring 26 which, like the spring 15, is coiled about the axle 10. However, one end of the spring 26 engages a fixed pin 26a on the base plate 2 and the other end engages a pin 25b on the adjusting lever 25 to influence the latter for counterclockwise movement thereby pressing the pin 25a against a second cam surface 22b of the exposure time setting member 22. The transmission member 24 is resiliently biased by means of a spring 27 coiled about the pin 25a. One end of the transmission member engages a pin 24a and the other end engages a pin 25c to urge the transmission member 24 in a counterclockwise direction, whereby a nose 24b of the member 24 comes into engagement with the pin 25c. The driving member 8 has a driver 8e which engages a stop 24c that extends laterally from the transmission member 24. The arrangement of the stop 24c is such that it lies in the path of motion of the driver 8e only when the exposure time setting member 22 is set for extremely short duration exposures, which is the position illustrated in FIGS. 1 and 3. By appropriately shaping the cam 22b, the adjusting lever 25 may also be moved to another setting position in which the stop 24c is located outside of the path of motion of the driver 8e for longer duration exposure.

The base plate 2 has an arcuate opening 2c through which a pin 5c of the actuating member 5 extends. The location of this arcuate opening determines the range of movement of the pin 5c, and is within the pivoting range of the transmission member 24 so that the latter can engage the pin 5c. In addition, the base plate 2 has another opening 2d through which still another pin 5d extends from the driving ring 5. A fixed stop 28 is located at the opening 2d by means of a screw 28a to bring about reversal of the motion of the driving ring 5.

The operation of the shutter arrangement is as follows:

When the shutter is set for extremely short exposure times, the exposure time setting member 22 is moved into the setting position in which both the deflecting member 20 and the transmission member 24 occupy the position illustrated in FIG. 1. When the shutter release lever 13 is actuated so as to actuate the arresting lever 11, the shutter driving member 8 will begin to rotate clockwise under pressure of the spring 9. This action causes the pawl 16 to move to the right and to push the pin 5b and the driving ring 5 in a clockwise direction. This motion is transmitted to the shutter blades 6 by way of the pins 6a and causes the shutter blades 6 to swing from the closed position indicated in FIG. 1 to the opened position indicated in FIG. 2. Shortly before the termination of this phase of the motion of the driving pawl 16, the oblique edge 16c of the pawl 16 strikes the pin 20a of the deflecting member 20 which deflects the pawl and disengages the pawl from the pin 5b as shown in FIG. 2. At this time the shutter blades 6 have attained their fully opened position, but because of the disengagement of the pin 5b from the pawl 16, the blades are free to return immediately to the closed position. One of the factors that assists this reversal of motion is that the pin 5d strikes the stop 28 and rebounds therefrom, thereby starting the driving ring 5 in the reverse, or counterclockwise, direction.

During the movement of the pawl 16 to the right, the driving member 8 rotates so that at the time the pawl 16 disengages from the pin 5b, the driver 8e strikes the stop 24c. The sharp engagement of the driver 8e against the stop 24c causes the driving lever 24 to strike the pin 5c with some of the potential energy remaining stored in the main driving spring 9. As a result, the shutter blades immediately return to the closed position as indicated in FIG. 3. As also shown in FIG. 3, the shutter driving member 8 does not complete an entire revolution but comes to a standstill after pawl 16 begins its return leftward movement, that is, immediately upon movement past the dead-point position. This mode of operation is graphically illustrated in the aperture-area time diagram of FIG. 6 and the diagram of FIG. 8. In FIG. 6, the motion of the shutter blades 6 follows the curve ABC and the shutter blades spend substantially no time in the fully opened position. This situation is also graphically depicted in FIG. 8.

When the shutter is to be used to obtain exposure times of longer duration, the exposure time setting member must be set at the desired indicated position. In the embodiment shown, the exposure time member 22 is rotated clockwise to whatever extent is necessary to reach the correct setting. In any event, after only a short motion, both the pin 20b of the deflecting member 20 and the pin 25a of the adjusting lever 25 move off of the sections of the cam surfaces 22a and 22b shown in FIGS. 1–3 and onto the section indicated in FIG. 4. As a result, both the deflecting member 20 and the transmission member 24 move outwardly from the center of the shutter so that the pin 20a is out of the range of motion of the oblique edge 16c of the driving pawl 16, and the stop 24c of the transmission member 24 is outside of the range of motion of the driver 8e.

Figure 5:
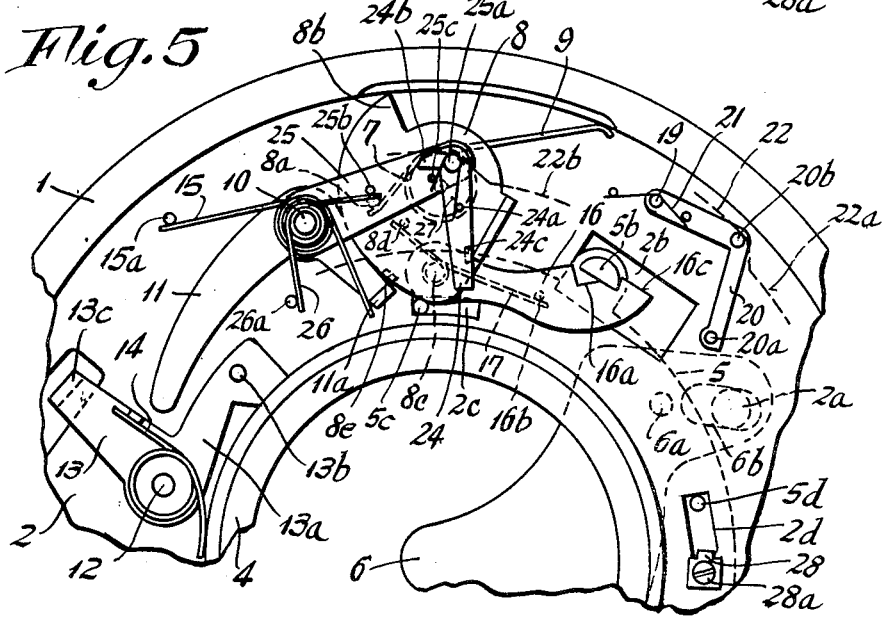
FIG. 5 is a view similar to that of FIG. 4 showing the shutter at the same exposure time setting but in run-down position. The shutter blades are in closed position.

Operation of the shutter trigger, when the exposure time setting member is so adjusted, causes the release lever 13 to rotate counterclockwise, thereby rotating the arresting lever 11 clockwise and permitting the driving member 8 to turn under the force of the spring 9. As heretofore described, this action causes the driving pawl 16 to move to the right thereby pushing the pin 5b clockwise and causing the shutter blades 6 to open just as in FIG. 2. However, since the pin 20a does not intercept the oblique edge 16c, the pin 5b remains in the grip of the pawl 16. As the driving member 8 continues to rotate the pawl will remain for some time in or close to its position farthest to the right and as a consequence the pin 5b will also remain in its extreme clockwise position. Finally, depending upon the speed of rotation of the driving member 8, the pawl 16 will be pulled back to the left carrying with it the pin 5b until finally it returns the pin 5b to the original position as shown in FIG. 5. As may be seen by a comparison of the position of the members in FIG. 5 and in FIG. 3, the driving member 8 rotates farther when the shutter is operated at a lower speed than when the shutter is operated at its highest speed. Presented graphically, the operation of the shutter blades 6 at low speeds follows the curve ABDE in FIG. 6 which corresponds to the time diagram of FIG. 7.

While the invention has been described in detail in a specific embodiment thereof it will be understood that this description is for illustrative purposes only and that variations and modifications may be made without departing from the spirit of the invention or the scope of the appended claims.

What is claimed is:

1. A photographic shutter comprising a reciprocating shutter blade movable in one direction from a closed position to an open position and in the reverse direction from said open position to said closed position; a shutter actuating member connected to said blade to control the motion thereof; a driving member; a driving pawl connected to said driving member to be operated thereby, said driving pawl engaging said actuating member to move said blade from its closed position to its open position; a deflecting member; an exposure time setting member operatively engaging said deflecting member to move the same into and out of the path of motion of said pawl to disengage said actuating member from said pawl; a transmission member operatively connected with said exposure time setting member whereby, when said exposure time setting member is set to a position to place said deflecting member in the path of motion of said pawl, said transmission member is positioned to engage said actuating member and to drive the same to move said shutter blade back to its original closed position as soon as said actuating member is disengaged from said pawl.

2. A photographic shutter comprising a reciprocating shutter blade movable in one direction from a closed position to an open position and in the reverse direction from said open position to said closed position; a shutter actuating member connected to said blade to control the motion thereof; a driving member; a driving pawl connected to said driving member to be operated thereby, said pawl engaging said actuating member to move said blade from its closed position to its open position; a movable deflecting member; an exposure time setting member operatively engaging said deflecting member to move the same into and out of the path of motion of said pawl whereby said deflecting member can intercept said pawl and can disengage said pawl from said actuating member when said actuating member moves said blade to its wide open position; a transmission member operatively connected with said exposure time setting member whereby, when the exposure time setting member is set to a position to place said deflecting member in the path of motion of said pawl, said transmission member is positioned to engage said actuating member and to drive the same to move said shutter blade back to its original closed position as soon as said actuating member is disengaged from said pawl.

3. A photographic shutter comprising a reciprocating shutter blade movable in one direction from a closed position to an open position and in the reverse direction from said open position to said closed position; a shutter actuating member connected to said blade to control the motion thereof; a rotary driving member; a driving pawl connected to said driving member to be operated thereby, said driving pawl engaging said actuating member to move said blade from its closed position to its open position; a movable deflecting member; an exposure time setting member operatively engaging said deflecting member to move the same into and out of the path of motion of said pawl to disengage said actuating member from said pawl when said deflecting member is in the path of motion of said pawl; a transmission member operatively connected with said exposure time setting member whereby, when said exposure time setting member is set to a position to place said deflecting member in the path of motion of said pawl, said transmission member is positioned to engage said actuating member and to be struck by said driving member to move said shutter blade back to its original closed position as soon as said actuating member is disengaged from said pawl.

4. A photographic shutter comprising a reciprocating shutter blade movable in one direction from a closed position to an open position and in the reverse direction from said open position to said closed position; a shutter actuating member connected to said blade to control the motion thereof; a rotary driving member; a spring for rotating said driving member to make an exposure; a driving pawl connected to said driving member to be operated thereby, said pawl engaging said actuating member to move said blade from its closed position to its open position; a movable deflecting member; an exposure time setting member operatively engaging said deflecting member to move the same into and out of the path of motion of said pawl whereby said deflecting member can intercept said pawl and deflect it aside to intercept said pawl and can disengage said pawl from said actuating member at substantially the point at which said actuating member moves said blade to its wide open position; a transmission member operatively connected with said exposure time setting member whereby, when the exposure time setting member is set to a position to place said deflecting member in the path of motion of said pawl, said transmission member is positioned to engage said actuating member and said driving member at a point in the rotation of said driving member where energy is still stored in said spring to drive said shutter blade back to its original closed position as soon as said actuating member is disengaged from said pawl.

5. A photographic shutter comprising reciprocating shutter blades movable in one direction from a closed position to an open position and in the reverse direction from said open position to said closed position; a shutter actuating member connected to said blades to control the motion thereof; a driving member; a spring for moving said driving member to make an exposure; a driving pawl connected to said driving member to be operated thereby, said pawl engaging said actuating member to move said blades from their open position to their closed position; a movable deflecting member; an exposure time setting member operatively engaging said deflecting member to move the same into and out of the path of motion of said pawl whereby, when said deflecting member is in the path of motion of said pawl, said deflecting member can intercept said pawl and disengage said pawl from said actuating member at substantially the point in the path of movement of said actuating member corresponding to said open position of said blades; an adjusting member operatively engaging said exposure time setting member to be moved thereby; a transmission member movably supported by said adjusting member and positionable thereby into and out of the path of motion of said driving member, said adjusting member and said deflecting member being operated simultaneously by said exposure time setting member whereby said transmission member is positioned to be struck by said driving member so as to move said shutter blades back to its original closed position as soon as said actuating member is disengaged from said pawl by said deflecting member.

6. A photographic shutter comprising reciprocating shutter blades movable in one direction from a closed position to an open position and in the reverse direction from said open position to said closed position; a shutter actuating ring connected to said blades to control the motion thereof; a driving member; a spring for moving said driving member to make an exposure; a driving pawl connected to said driving member to be operated thereby, said pawl engaging said actuating member to move said blades from their open position to their closed position; a movable deflecting member; an exposure time setting member operatively engaging said deflecting member to move the same into and out of the path of motion of said pawl whereby, when said deflecting member is in the path of motion of said pawl, said deflecting member can intercept said pawl and disengage said pawl from said actuating member at substantially the point in the path of movement of said actuating member corresponding to said open position of said blades; an adjusting lever operatively engaging said exposure time setting member to be moved thereby; a transmission member pivotally supported by said adjusting lever and positionable thereby into and out of the path of motion of said driving member, said adjusting lever and said deflecting member being operated simultaneously by said exposure time setting member whereby said transmission member is positioned to be struck by said driving member so as to move said shutter blades back to its original closed position as soon as said actuating ring is disengaged from said pawl by said deflecting member.

7. A photographic shutter comprising reciprocating shutter blades movable in one direction from a closed position to an open position and in the reverse direction from said open position to said closed position; a shutter actuating member connected to said blades to control the motion thereof; a driving member; a spring for moving said driving member to make an exposure; a driving pawl connected to said driving member to be operated thereby, said pawl engaging said actuating member to move said blades from their open position to their closed position; a movable deflecting member; an exposure time setting member having a cam operatively engaging said deflecting member to move the same into and out of the path of motion of said pawl whereby, when said deflecting member is in the path of motion of said pawl, said deflecting member can intercept said pawl and disengage said pawl from said actuating member at substantially the point in the path of movement of said actuating member corresponding to said open position of said blades; an adjusting lever operatively engaging said exposure time setting member to be moved thereby; a transmission member pivotally supported by said adjusting lever and positionable thereby into and out of the path of motion of said driving member, said adjusting lever and said deflecting member being operated simultaneously by said exposure time setting member whereby said transmission member is positioned to be struck by said driving member so as to move said shutter blades back to its original closed position as soon as said actuating ring is disengaged from said pawl by said deflecting member.

8. A photographic shutter comprising reciprocating shutter blades movable in one direction from a closed position to an open position and in the reverse direction from said open position to said closed position; a shutter actuating member connected to said blades to control the motion thereof; a driving member; a spring for moving said driving member to make an exposure; a driving pawl connected to said driving member to be operated thereby, said pawl engaging said actuating member to move said blades from their open position to their closed position; a movable deflecting member; an exposure time setting member operatively engaging said deflecting member to move the same into and out of the path of motion of said pawl whereby, when said deflecting member is in the path of motion of said pawl, said deflecting member can intercept said pawl and disengage said pawl from said actuating member at substantially the point in the path of movement of said actuating member corresponding to said open position of said blades; an adjusting lever; a cam on said exposure time setting member operatively engaging said adjusting lever to move the same; a transmission member pivotally supported by said adjusting lever and positionable thereby into and out of the path of motion of said driving member, said adjusting lever and said deflecting member being operated simultaneously by said exposure time setting member whereby said transmission member is positioned to be struck by said driving member so as to move said shutter blades back to its original closed position as soon as said actuating member is disengaged from said pawl by said deflecting member.

9. A photographic shutter comprising reciprocating shutter blades movable in one direction from a closed position to an open position and in the reverse direction from said open position to said closed position; a shutter actuating member connected to said blades to control the motion thereof; a driving member; a spring for moving said driving member to make an exposure; a driving pawl connected to said driving member to be operated thereby, said pawl engaging said actuating member to move said blades from their open position to their closed position; a movable deflecting member; an exposure time setting member having a first cam operatively engaging said deflecting member to move the same into and out of the path of motion of said pawl whereby, when said deflecting member is in the path of motion of said pawl, said deflecting member can intercept said pawl and disengage said pawl from said actuating member at substantially the point in the path of movement of said actuating member corresponding to said open position of said blades; an adjusting lever; a second cam on said exposure time setting member operatively engaging said adjusting lever to move the same; a transmission member pivotally supported by said adjusting lever and positionable thereby into and out of the path of motion of said driving member, said deflecting member and said adjusting lever being operated simultaneously by said first and second cams on said exposure time setting member whereby said transmission member is positioned to be struck by said driving member so as to move said shutter blades back to its original closed position as soon as said actuating member is disengaged from said pawl by said deflecting member.

10. A photographic shutter comprising reciprocating shutter blades movable in one direction from a closed position to an open position and in the reverse direction from said open position to said closed position; a shutter actuating ring connected to said blades to control the motion thereof; a driving member; a driver on said driving member; a spring for moving said driving member to make an exposure; a driving pawl connected to said driving member to be operated thereby, said pawl engaging said actuating member to move said blades from their open position to their closed position; a movable deflecting member; an exposure time setting member operatively engaging said deflecting member to move the same into and out of the path of motion of said pawl whereby, when said deflecting member is in the path of motion of said pawl, said deflecting member can intercept said pawl and disengage said pawl from said actuating member at substantially the point in the path of movement of said actuating member corresponding to said open position of said blades; an adjusting lever operatively engaging said exposure time setting member to be moved thereby; a transmission member pivotally supported by said adjusting lever; a stop on said transmission member positionable thereby into and out of the path of motion of said driver—said adjusting lever and said deflecting member being operated simultaneously by said exposure time setting member whereby said stop on said transmission member is positioned to be struck by said driver—so as to cause said transmission member to move said shutter blades back to their original closed position as soon as said actuating ring is disengaged from said pawl by said deflecting member.

11. A photographic shutter comprising reciprocating shutter blades movable in one direction from a closed position to an open position and in the reverse direction from said open position to said closed position; a shutter actuating member connected to said blades to control the motion thereof; a driving member; a spring for moving said driving member to make an exposure; a driving pawl connected to said driving member to be operated thereby, said pawl engaging said actuating member to move said blades from their open position to their closed position; a movable deflecting member; an exposure time setting member operatively engaging said deflecting member to move the same into and out of the path of motion of said pawl whereby, when said deflecting member is in the path of motion of said pawl, said deflecting member can intercept said pawl and disengage said pawl from said actuating member at substantially the point in the path of movement of said actuating member corresponding to said open position of said blades; an adjusting lever operatively engaging said exposure time setting member to be moved thereby; a transmission member pivotally supported by said adjusting lever and positionable thereby into and out of the path of motion of said driving member, said adjusting lever and said deflecting member being operated simultaneously by said exposure time setting member whereby said transmission member is positioned to be struck by said driving member so as to move said shutter blades back to their original closed position as soon as said actuating ring is disengaged from said pawl by said deflecting member; and a fixed stop positioned to engage said actuating member at said point corresponding to said open position of said blades to reflect said actuating member and said blades back in said reverse direction.

References Cited in the file of this patent
UNITED STATES PATENTS
2,893,301    Weise _____ July 7, 1959